United States Patent
Yoshino

(10) Patent No.: US 7,105,216 B2
(45) Date of Patent: Sep. 12, 2006

(54) CONDUCTIVE RESIN COATED STEEL PIPE AND EXTRUSION MOLDING METHOD FOR THE STEEL PIPE

(75) Inventor: Shuji Yoshino, Shizuoka (JP)

(73) Assignee: Yazaki Industrial Chemical Co., Ltd., Shizuoka (JP)

( * ) Notice: Subject to any disclaimer, the term of this patent is extended or adjusted under 35 U.S.C. 154(b) by 284 days.

(21) Appl. No.: 10/472,163

(22) PCT Filed: Mar. 11, 2002

(86) PCT No.: PCT/JP02/02234

§ 371 (c)(1),
(2), (4) Date: Sep. 19, 2003

(87) PCT Pub. No.: WO02/076728

PCT Pub. Date: Oct. 3, 2002

(65) Prior Publication Data

US 2004/0086672 A1    May 6, 2004

(30) Foreign Application Priority Data

Mar. 22, 2001    (JP)    ............... 2001-083044

(51) Int. Cl.
*B05D 5/00* (2006.01)
*B32B 1/08* (2006.01)

(52) U.S. Cl. ................ 428/36.9; 138/146; 138/DIG. 7; 156/244.11; 427/261; 427/287; 427/409; 428/34.1; 428/35.7; 428/35.8; 428/35.9; 428/36.91; 428/119; 428/161; 428/163

(58) Field of Classification Search ............... 428/34.1, 428/35.7, 35.8, 35.9, 36.9, 119, 161, 163; 138/146, DIG. 7; 427/261, 287, 409; 156/244.11
See application file for complete search history.

(56) References Cited

FOREIGN PATENT DOCUMENTS

| JP | 61-14948 A | 1/1986 |
| JP | 1-2921 A | 1/1989 |
| JP | 7-28633 U | 5/1995 |

*Primary Examiner*—Nasser Ahmad
(74) *Attorney, Agent, or Firm*—Dellett & Walters

(57) ABSTRACT

A conductive resin coated steel pipe and an extrusion molding method for the steel pipe capable of using filler instead of carbon black and not only lowering a production cost but also further increasing an attractiveness; the resin coated steel pipe, wherein a regenerated resin (3) such as polyethylene, ABS, AAS, and the outer peripheral surface of a thin-walled steel pipe (2) is coated with polypropylene, and a conductive resin (4) such as polyethylene, ABS, AAS, and polypropylene mixed with filler on the outer peripheral surface of the coated resin (3) is axially uniformized in cross section by a double coated structure where the portion (4b) thereof having a wall thickness and a width necessary for developing the conductivity thereof are provided at one or more positions in the circumferential direction of a pipe body and the entire outer peripheral surface thereof is coated thinly with the resin.

9 Claims, 5 Drawing Sheets

(A)

(B)

(A)

(B)

CONDUCTIVE RESIN COATED STEEL PIPE AND EXTRUSION MOLDING METHOD FOR THE STEEL PIPE

FIELD OF SEARCH

The present invention belongs to a technical field of a conductive-resin-coated steel pipe and a method of extrusion-forming it. More specifically, the present invention relates to a conductive-resin-coated steel pipe which is suited to be used as, for example, a frame component of a structure such as a flow-through rack, a driven conveyor or the like for holding or transporting parts of low electrical current devices or the like, and a method of extrusion-forming it.

BACKGROUND OF THE INVENTION

A conductive-resin-coated steel pipe of about 28–32 mm in outer diameter is used as a frame component of a structure such as a flow-through rack, a driven conveyor or the like for holding or transporting parts of low electrical current devices or the like, in order to prevent static electrification. Thus, a coating of about 1 mm in thickness of conductive synthetic resin containing carbon black is formed on the outer circumferential surface of a thin-walled steel pipe of about 26–30 mm in outer diameter.

However, due to the use of carbon black, the above-mentioned conductive-resin-coated steel pipe has problems. That is, the use of carbon black makes the unit cost of the pipe expensive and makes the pipe black, which is not of pleasing appearance. Further, the carbon adheres to things that comes in contact with the pipe.

Taking these problems into consideration, the applicant has proposed a conductive-resin-coated steel pipe disclosed in Japanese Examined Utility Model Publication No. H8(1996)-5796, wherein on the outer circumferential surface of a thin-walled steel pipe, a coating of about 1 mm in thickness of synthetic resin such as AAS resin or the like of a chromatic color is formed, and on top of that coating a strip of conductive synthetic resin containing carbon black is formed integrally in the axial direction of the conductive-resin-coated steel pipe.

In this conductive-resin-coated steel pipe, the use of carbon black is reduced, which contributes to lowering the unit production cost.

Regarding the above-mentioned conductive-resin-coated steel pipe disclosed in Japanese Examined Utility Model Publication No. H8(1996)-5796, improvement in cost and appearance is acknowledged, to be sure, but conductive synthetic resin containing carbon black is still exposed although in the form of a strip. Therefore, the problem that the exposed carbon black adheres to things that come in contact with the pipe remains unsolved. Further, when an earth wire is to be connected to this pipe, it is necessary to pay attention to the position of a conductive portion. This causes another problem in that work efficiency is reduced.

In recent years, filler (fiber) having high impact resistance has been attracting attention. However, like the above-mentioned carbon black, the filler is expensive. Therefore, a steel pipe coated with resin containing the filler, particularly a steel pipe coated with conductive resin containing the filler has not been widely promoted.

Thus, the object of the present invention is to provide a conductive-resin-coated steel pipe in which filler is used in place of carbon black and which enables lower unit production cost and a better appearance, and a method of extrusion-forming such pipe.

DISCLOSURE OF THE INVENTION

To achieve the objects described above, the invention as recited in claim 1 relates to a conductive resin-coated steel pipe (1), is characterized in that a coating of reprocessed resin (3) such as polyethylene, ABS (acrylonitrile-butadiene-styrene copolymer), AAS (acrylonitrile-acrylic rubber-styrene copolymer), polypropylene or the like, is formed on an outer circumferential surface of a thin-walled steel pipe (2), and a coating of conductive resin (4), such as polyethylene, ABS. AAS, polypropylene or the like, which said conductive resin is combined with a filler, is formed on an outer circumferential surface of said coating of reprocessed resin (3) (reprocessed resin being old or recycled resin as contrasted with new or fresh resin), wherein said coating of conductive resin consists of plural thinner-and-wider layer-portions (4a) and plural thicker-and-narrower layer-portions (4b) to exhibit electrical conductivity, which said portions alternate along said outer circumferential surface of said coating of reprocessed resin and arranged in a circumferential direction of said pipe, and said coating of reprocessed resin and said coating of conductive resin form a thin two-layer coating that covers an entire outer circumferential surface of said thin-walled steel pipe and has a uniform cross-section in an axial direction of said pipe.

In the conductive-resin-coated steel pipe according to an aspect of the invention, the invention is characterized in that said thin-walled steel pipe (2) is round in cross section, and said coating of conductive resin (4), which said conductive resin is combined with said filler, consists plural pairs of equal thinner-and-wider layer-portions (4a) and equal thicker-and-narrower layer-portions (4b) to exhibit electrical conductivity, which said portions alternate along the outer circumferential surface of said coating of reprocessed resin (3).

The conductive-resin-coated steel pipe (1) according to the invention is characterized in that said thickness and width required for a portion of the coating of said conductive resin (4), which said conductive resin is combined with said filler, to exhibit electrical conductivity is at least approximately 0.5 mm and at least 2 mm, respectively.

In the conductive-resin-coated steel pipe(1) according to aspects of the invention, the invention is characterized in that said conductive resin (4), which said conductive resin is combined with said filler, is loaded with a colorant to give to said conductive-resin-coated steel pipe a chromatic color.

The invention further relates to a method of extrusion-forming a conductive-resin-coated steel pipe, characterized in that a coating of reprocessed resin (3) such as polyethylene, ABS, AAS, polypropylene or the like is formed on an outer circumferential surface of a thin-walled steel pipe (2) by extrusion-forming method and a coating of conductive resin (4), such as polyethylene, ABS, AAS, polypropylene or the like, which said conductive resin is combined with a filler, is extrusion-formed on an outer circumferential surface of said coating of reprocessed resin (3) by extrusion-forming method, wherein said coating of conductive resin is made to have plural thinner-and-wider layer-portions (4a) and plural thicker-and-narrower layer-portions (4b) to exhibit electrical conductivity, which said portions alternate along said circumferential surface of said coating of reprocessed resin and arranged in a circumferential direction of said pipe and said coating of reprocessed resin and said coating of conductive resin are made to form a thin, two-layer coating that covers an entire outer circumferential surface of said thin-walled steel pipe and has a uniform cross-section in an axial direction of said pipe.

THE MOST PREFERRED EMBODIMENT OF THE INVENTION

Figure 1:
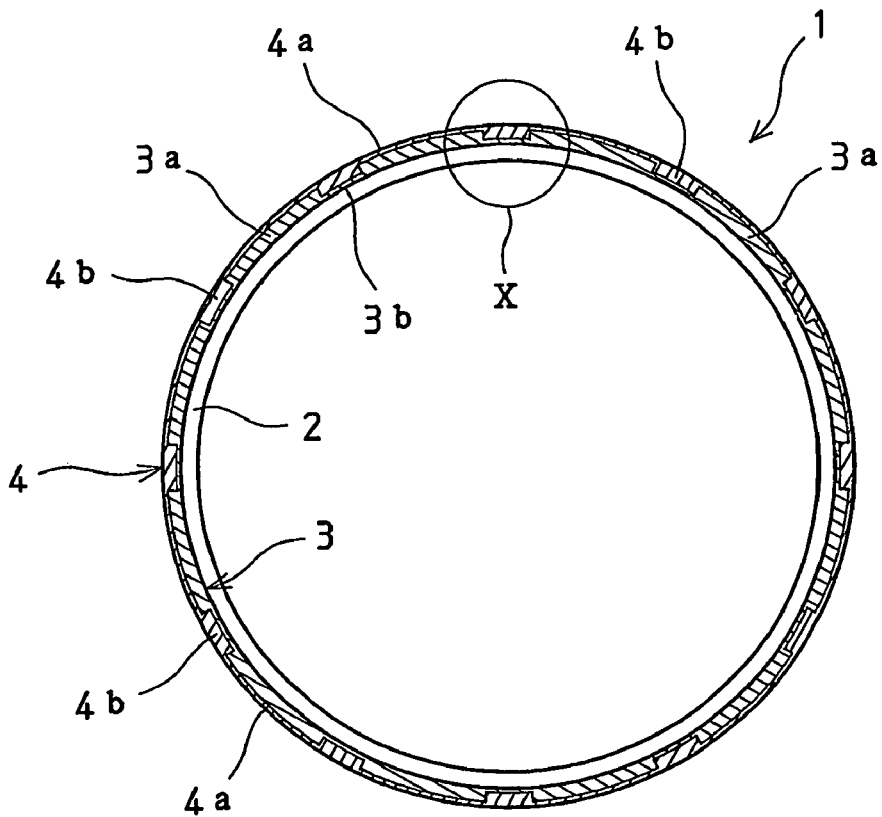
FIG. 1A is a cross-sectional view of a conductive-resin-coated steel pipe according to the present invention.
FIG. 1B shows part X of FIG. 1A on an enlarged scale.
Figure 1:
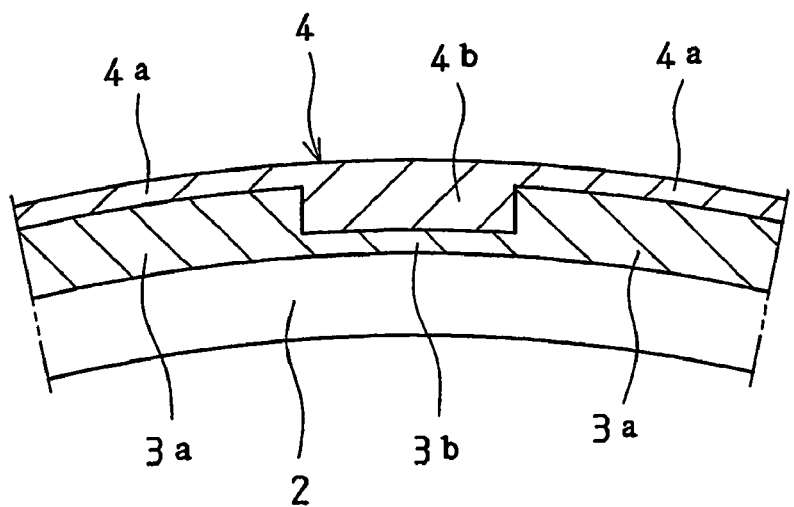

FIGS. 1A and 1B shows an embodiment of a conductive-resin-coated steel pipe 1. The conductive-resin-coated steel pipe 1 is suited to be used as, for example, a frame component of a structure such as a flow-through rack, a driven conveyor or the like for holding or transporting parts of low electrical current devices or the like. The conductive-resin-coated steel pipe 1 is based on a technical idea of using inexpensive reprocessed resin and reducing the use of conductive resin containing expensive filler, in either case to the extent possible while at the same time ensuring sufficient electrical conductivity.

In the conductive-resin-coated steel pipe 1, first, a coating of reprocessed resin 3, such as polyethylene, ABS, AAS, polypropylene or the like, is formed on the outer circumferential surface of a thin-walled steel pipe 2. Then, on the outer circumferential surface of this coating of resin (reprocessed resin 3), a coating of conductive resin 4 such as polyethylene, ABS, AAS, polypropylene or the like, combined with a filler, is formed in a manner that, in the case of FIG. 1, 12 equal portions 4b each having a thickness and width required for the portion 4b to exhibit electrical conductivity, are arranged in 12 positions equally spaced apart in the circumferential direction of the pipe. Each portion 4b extends continuously in the axial direction of the pipe, in the form of a strip, and the coating of reprocessed resin 3 and the coating of conductive resin 4 form a thin two-layer coating that covers the entire outer circumferential surface of the thin-walled steel pipe 2 and has a uniform cross-section in the axial direction of the pipe.

Substantially the same embodiment can be made by using resin other than the above mentioned ones, such as polystyrene or methacrylate resin, as the reprocessed resin 3. Nor is the conductive resin 4 restricted to use of the above-mentioned examples.

In the case of FIG. 1, 12 equal conductive portions 4b are provided equally spaced apart along the circumferential direction of the pipe. The reason that so many conductive portions 4b are provided is that, in the case of a structure such as a flow-through rack, a driven conveyor or the like can be constructed freely without paying special attention to the positions of the conductive portions 4b to which a ground wire need be connected. As long as at least one conductive portion 4b extends continuously in the axial direction of the pipe, it it will be sufficient for a ground wire to be connected. However, in the case where only one conductive portion 4b is provided, it would be necessary to construct the structure, taking the position of the conductive portion 4b into consideration.

The coating of conductive resin 4 on the outer circumferential surface of the coating of reprocessed resin 3 consists of thinner-and-wider layer-portions 4a and thicker-and-narrower layer-portions (conductive portions), 4b. Accordingly, the coating of reprocessed resin 3 necessarily consists of thicker-and-wider layer-portions 3a and thinner-and-narrower layer-portions 3b. In the conductive-resin-coated steel pipe 1 shown in FIG. 1, the thin-walled steel pipe 2 is round in cross section, and the coating of conductive resin 4 consist of 12 equal thinner-and-wider layer-portions 4a and 12 equal thicker-and-narrower layer-portions, (conductive portions) 4b which alternate along the circumferential surface of the coating of reprocessed resin 3. Needless to say, the number of the portions 4a (portions 4b) is not restricted to 12.

Specifically, in the example of FIG. 1, the thin-walled steel pipe 2 is a little less than 1 mm in wall thickness and about 26–30 mm in outer diameter. Each thinner-and-wider layer-portion 4a of the coating of conductive resin 4 is approximately 0.2 mm in thickness, and each thicker-and-narrower layer-portion, (the conductive portions) 4b is approximately 0.7 mm in thickness and approximately 2 mm in width. Each thicker-and-wider layer-portion 3a of the coating of reprocessed resin 3 is approximately 0.7 mm in thickness, and each thinner-and-narrower layer-portion 3b thereof is approximately 0.2 mm in thickness. Therefore, the conductive-resin-coated steel pipe 1 is extrusion-formed and round in cross section, and approximately 27.8–32 mm in outer diameter.

In the conductive-resin-coated steel pipe 1, the conductive resin 4 is loaded with a colorant to produce a chromatic color such as green, ivory or the like.

Thus, in the case of the above-described conductive-resin-coated steel pipe 1, inexpensive reprocessed resin 3 is used to the greatest possible extent and the use of conductive resin 4 containing expensive filler is restricted to the minimum amount required to produce electrical conductivity. Thus, resources can be conserved and the unit production cost can be lowered. Of course, a ground wire can be connected. Secondly, since a resin combined with filler is used, there is no concern that color rub off and/or produce stains. Thirdly, by using the resin loaded with a colorant for a desired chromatic color, the appearance of the conductive-resin-coated steel pipe can be improved. Not only it is possible to make a conductive-resin-coated steel pipe having a bright color, but also it is possible to choose the color to match the work environment.

Next, an embodiment of the method of extrusion-forming a conductive-resin-coated steel pipe having the above-described structure according to the invention will be described on the basis of FIG. 2, etc.

Figure 2:
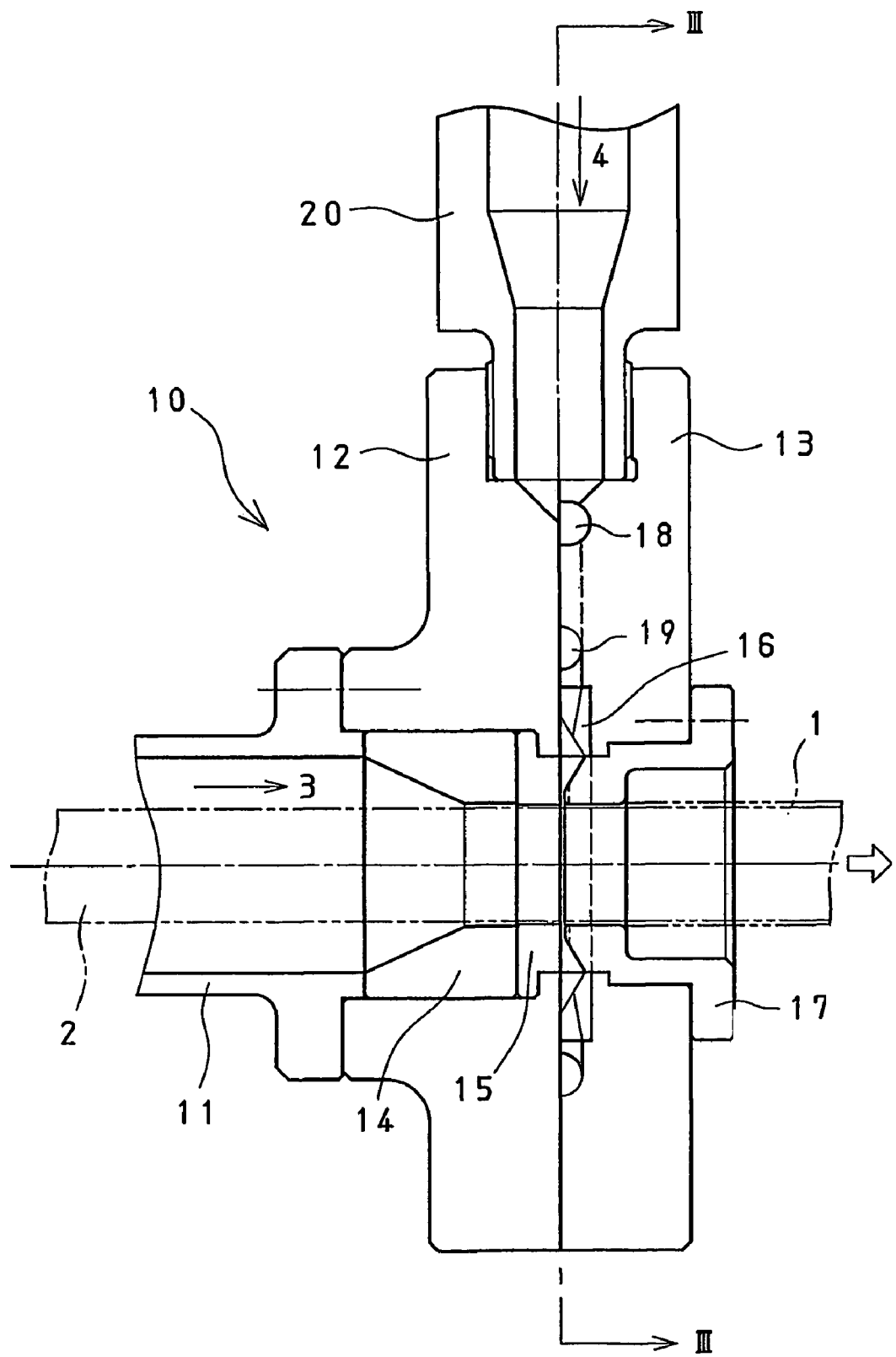
FIG. 2 is an elevation of a main part of a cross die type extruding machine.
Figure 3:
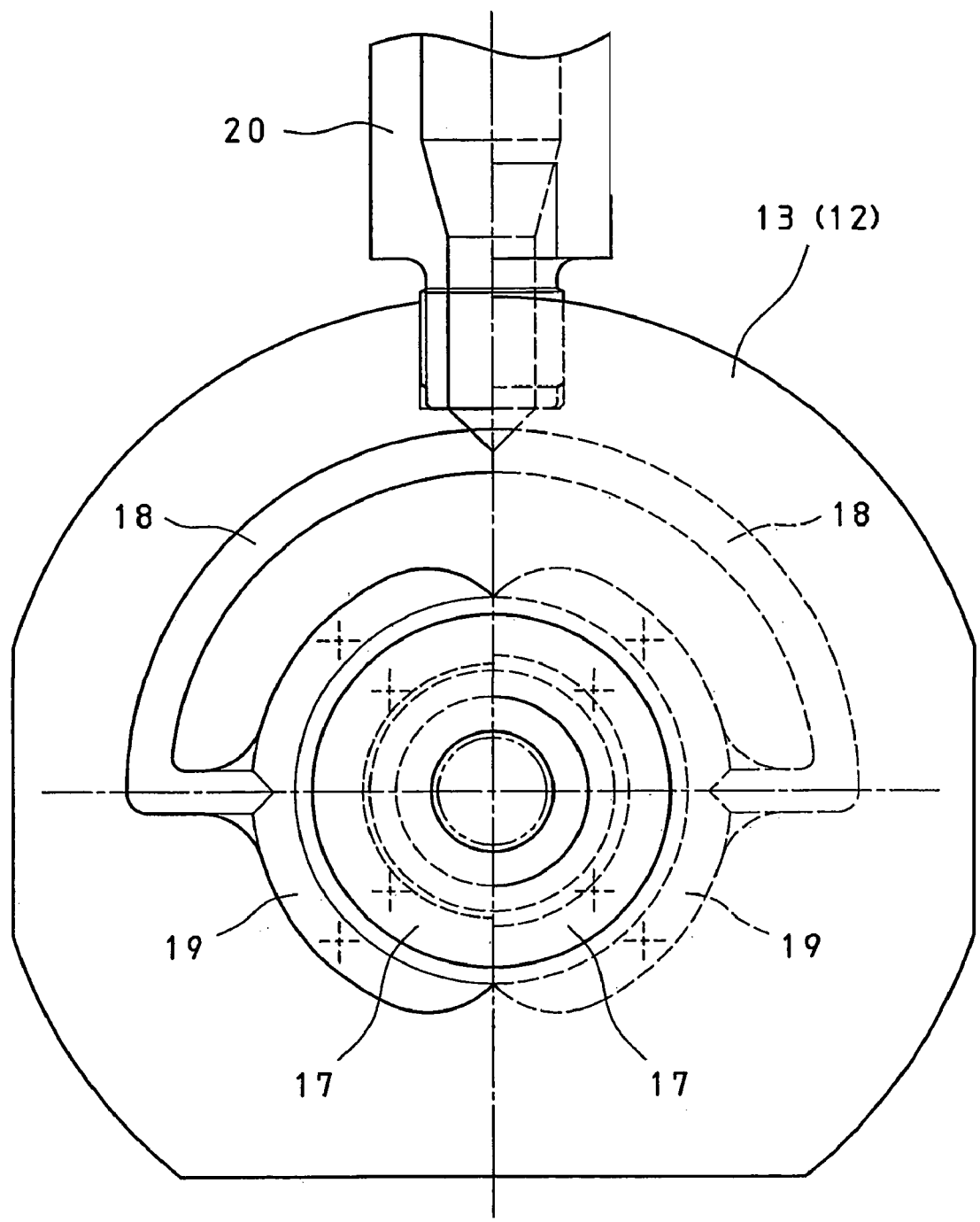
FIG. 3 is a cross-sectional view taken along line III—III of FIG. 2.

FIGS. 2 and 3 show a cross die type extruding machine used in the above-mentioned extrusion-forming method. In FIG. 2, reference numeral 10 denotes a head portion of a cross die that is a main part of the extruding machine. The basic structure is similar to that of an extruding machine according to the applicant's Japanese Patent No.2867244.

In the extruding machine, an adaptor 11 is fixed at the front end of a cross die (not shown), and a distribution piece 14 and a head 15 for inner-layer forming resin are fixed to the front end of the adaptor 11 by means of a distribution plate 12. Further, in front of the afore mentioned pieces, a radial distribution piece 16 and a head 17 for outer-layer forming resin are fixed by means of a distribution plate 13. The distribution plates 12 and 13 are joined together. A connecting piece 20, which is connected to a heating cylinder, is fixed to the upper areas of the joint surface of the distribution plates 12 and 13. By means of the head 15 for inner-layer forming resin, reprocessed resin 3 supplied from the cross die is formed into a coating on the outer circumferential surface of the thin-walled steel pipe 2, and then by means of the head 17 for outer-layer forming resin, conductive resin 4 supplied from the heating cylinder is formed into a coating on the outer circumferential surface of the coating of reprocessed resin 3.

The flow path for conductive rein 4 from the connecting piece 20 to the head 17 for outer-layer forming resin includes a first flow path 18 in the form of a large semicircular arch running around the thin-walled steel pipe 2. The opposite end portions of the first flow path 18 are bent and connected to inside second flow paths 19, 19, which are of a smaller diameter. The second flow paths 19, 19 are joined, wherein their joint portions are narrowed so that resin can be extruded uniformly toward the center.

Figure 5:
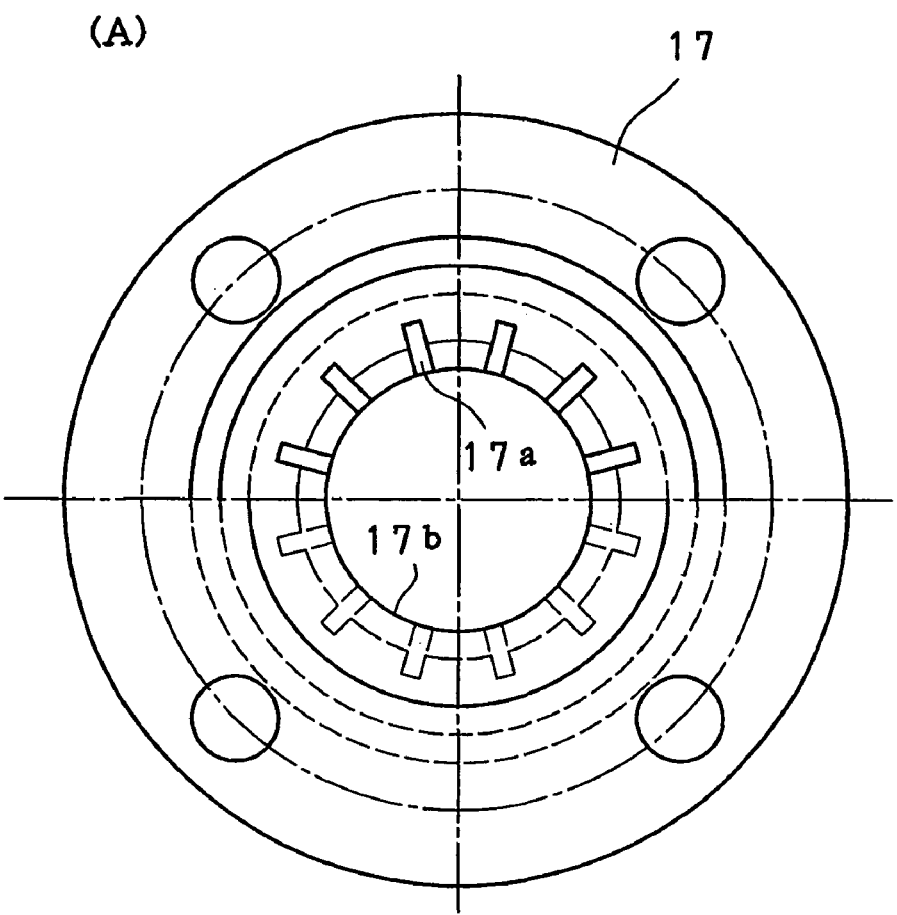
FIGS. 5A and 5B are a front view and a cross-sectional view, respectively, of a head for outer-layer forming resin.
Figure 5:
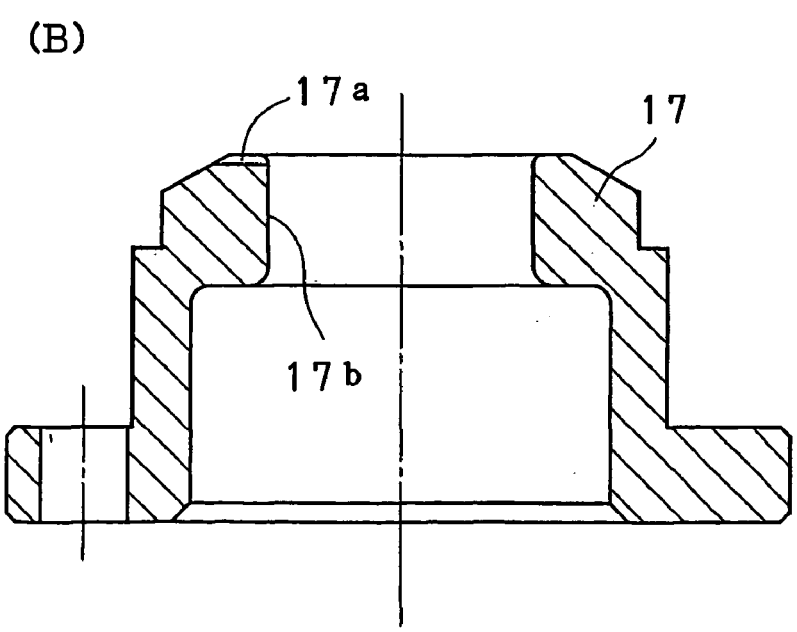

The second flow paths 19, 19 are connected to radial flow paths formed in the radial distribution piece 16, and radial flow paths 17a and a through-hole 17b of the head 17 for outer-layer forming resin (see FIG. 5).

Figure 4:
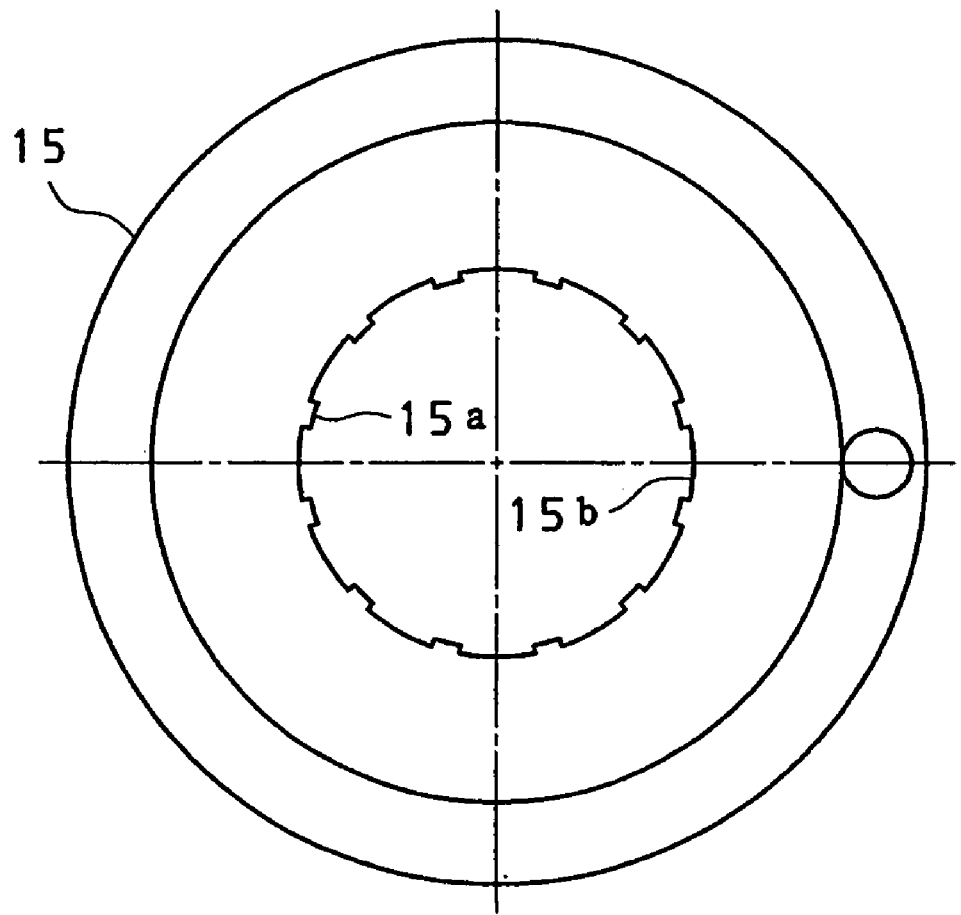
FIGS. 4A and 4B are a front view and a cross-sectional view, respectively, of a head for inner-layer forming resin.
Figure 4:
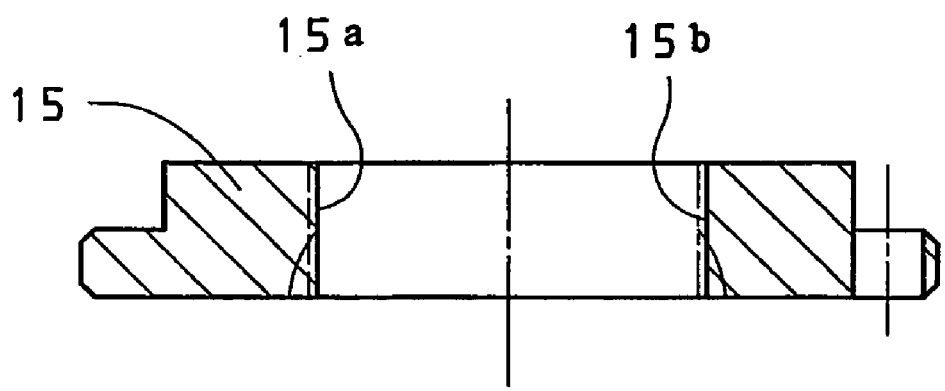

As shown in FIGS. 4A and 4B, the head 15 for inner-layer forming resin has a through-hole 15a for forming a coating of reprocessed resin 3. The circumferential surface defining the through-hole 15a consists of 12 equal ridges and 12 equal channels 15b which alternate in the circumferential direction and each extend in the axial direction of the pipe. The ridges are provided for forming thinner portions, and have a width of 2 mm. The channels 15b are provided for forming thicker portions, and have a depth of about 0.7 mm.

As shown in FIGS. 5A and 5B, the head 17 for outer-layer forming resin has radial paths 17a and a through-hole 17b for forming a coating of conductive resin 4 on the coating of reprocessed resin 3. The flow paths 17a are arranged to correspond to the ridges for forming thinner portions of the head 15 for inner-layer forming resin, and have substantially the same width as that of the ridge. The through-hole 17b defines the outer diameter of the conductive-resin-coated steel pipe 1.

The conductive-resin-coated steel pipe 1 is extrusion-formed with the above-described extruding machine as follows: First, on the outer circumferential surface of a thin-walled steel pipe 2 that is being moved from the cross die (not shown) to the right, a coating of reprocessed resin 3 is formed by means of the head 15 for inner-layer forming resin, wherein the reprocessed resin 3 is supplied to the head 15 through the adaptor 11 and the distribution piece 14.

Then, when the thin-walled steel pipe 2 reaches the head 17 for outer-layer forming resin, a coating of conductive resin 4 is formed on the outer circumferential surface of the coating of reprocessed resin 3 by means of the head 17, wherein the conductive resin 4 is supplied to the through-hole 17b from the connecting piece 20 through the first flow path 18, the second flow paths 19, the radial distribution piece 16, a space between the head 15 for inner-layer forming resin and the head 17 for outer-layer forming resin, and the flow paths 17a.

Thus, as shown in FIG. 1, a two-layer coating consisting of the coating of reprocessed resin 3 and the coating of conductive resin 4 and having a uniform outer diameter and cross-section in the axial direction of the pipe is extrusion-formed, wherein the coating of reprocessed resin 3 consists of alternating 12 equal thicker portions and 12 equal thinner portions and also the coating of conductive resin 4 consists of alternating 12 equal thicker portions and 12 equal thinner portions.

In the above, one embodiment of the present invention has been described on the basis of the drawings, however, the present invention is not limited to the shown embodiment. It is to be noted that the present invention encompasses changes of design and various applications which a person skilled in the art would ordinarily make, not deviating from the technical thought of the present invention.

INDUSTRIAL UTILIZATION

In the present invention relate to the steel pipe formed by the method of extrusion-forming a conductive-resin-coated steel pipe, I) inexpensive reprocessed resin is used as much as possible and the use of conductive resin containing expensive filler is restricted to the amount required to produce electrical conductivity. Thus, less resources are used, thereby contributing to environmental conservation, and the unit production cost can be lowered. Of course, a ground wire can be connected.

II) Further, since the resin loaded with filler is used, there is no concern that color may come off, producing stains.

III) Further, by using the resin loaded with a colorant for green, ivory or the like to have a desired chromatic color, the appearance of the conductive-resin-coated steel pipe can be improved. Thus, not only it is possible to make a conductive-resin-coated steel pipe with a bright color, but also it is possible to choose the color to match the working environment.

The invention claimed is:

1. A conductive-resin-coated steel pipe, characterized in that a coating of reprocessed resin (3) comprising polyethylene, ABS, AAS, or polypropylene, is formed on an entire outer circumferential surface of a steel pipe (2) and a coating of conductive resin (4), said conductive resin comprising polyethylene, ABS, AAS, or polypropylene, which said conductive resin is combined with a filler, is formed on an entire outer circumferential surface of said coating of reprocessed resin (3), wherein said coating of conductive resin consists of plural thinner-and-wider layer-portions (4a) and plural thicker-and-narrower layer-portions (4b) to exhibit electrical conductivity, which said portions alternate along said entire outer circumferential surface of said coating of reprocessed resin and arranged in a circumferential direction of said pipe, and said coating of reprocessed resin and said coating of conductive resin form a two-layer coating that covers the entire outer circumferential surface of said steel pipe, provides a smooth outermost circumferential surface and has a uniform cross-section in an axial direction of said pipe.

2. The conductive-resin-coated steel pipe according to claim 1, characterized in that said steel pipe (2) is round in cross section, and said coating of conductive resin (4), which said conductive resin is combined with said filler, consists of plural pairs of equal thinner-and-wider laye-portions (4a) and equal thicker-and-narrower layer-portions (4b) to exhibit electrical conductivity, which said portions alternate along the outer circumferential surface of said coating of reprocessed resin (3).

3. The conductive-resin-coated steel pipe according to claim 1, characterized in that said thickness and width required for a portion of the coating of said conductive resin (4), which said conductive resin is combined with said filler to exhibit electrical conductivity, is at least approximately 0.5 mm and at least 2 mm, respectively.

4. The conductive-resin-coated steel pipe according to claim 1, characterized in that said conductive resin (4), which said conductive resin is combined with said filler, is loaded with a colorant to give to said conductive-resin-coated steel pipe a chromatic color.

5. A method of extrusion-forming a conductive-resin-coated steel pipe, characterized in that a coating of reprocessed resin (3), said reprocessed resin comprising polyethylene, ABS, AAS, or polypropylene, is formed on an entire outer circumferential surface of a steel pipe (2) by extrusion-forming method and a coating of conductive resin (4), said conductive resin comprising polyethylene, ABS, AAS, or polypropylene, which said conductive resin is combined with a filler, is formed on an entire outer circumferential surface of said coating of reprocessed resin (3) by extrusion-forming method, wherein said coating of conjunctive resin is made to consist of plural thinner-and-wider layer-portions (4a) and plural thicker-and-narrower layers-portions (4b) to exhibit electrical conductivity, which said portions alternate along said entire outer circumferential surface of said coating of reprocessed resin and arranged in a circumferential direction of said pipe, and said coating of reprocessed resin and said coating of conductive resin are made to form a two-layer coating that covers the entire outer circumferential surface of said steel pipe, provides a smooth outermost circumferential surface, and has a uniform cross-section in an axial direction of said pipe.

6. The conductive-resin-coated steel pipe according to claim 2, characterized in that said thickness and width required for a portion of the coating of said conductive resin (4), which said conductive resin is combined with said filler to exhibit electrical conductivity, is at least approximately 0.5 and at least 2 mm, respectively.

7. The conductive-resin-coated steel pipe according to claim 6, characterized in that said conductive resin (4), which said conductive resin is combined with said filler, is loaded with a colorant to give to said conductive-resin-coated steel pipe a chromatic color.

8. The conductive-resin-coated steel pipe according to claim 2, characterized in that said conductive resin (4), which said conductive resin is combined with said filler, is loaded with a colorant to give to said conductive-resin-coated steel pipe a chromatic color.

9. The conductive-resin-coated steel pipe according to claim 3, characterized in that said conductive resin (4), which said conductive resin is combined with said filler, is loaded with a colorant to give to said conductive-resin-coated steel pipe a chromatic color.

* * * * *